US012761313B2

(12) United States Patent
Lin et al.

(10) Patent No.: US 12,761,313 B2
(45) Date of Patent: Oct. 13, 2026

(54) ULTRA-WIDE ANGLE RADAR SYSTEM

(71) Applicant: ROYALTEK COMPANY LTD., Taoyuan City (TW)

(72) Inventors: Kuo Wei Lin, Taoyuan City (TW); Chun Yen Chen, Taoyuan City (TW); Ming Hung Tsai, Taoyuan City (TW)

(73) Assignee: RoyalTek Company Ltd., Taoyuan City (TW)

( * ) Notice: Subject to any disclaimer, the term of this patent is extended or adjusted under 35 U.S.C. 154(b) by 241 days.

(21) Appl. No.: 18/426,660

(22) Filed: Jan. 30, 2024

(65) Prior Publication Data

US 2025/0216503 A1 Jul. 3, 2025

(30) Foreign Application Priority Data

Jan. 3, 2024 (TW) ................................ 113100298

(51) Int. Cl.
*G01S 7/03* (2006.01)
*G01S 7/02* (2006.01)
*G01S 13/931* (2020.01)

(52) U.S. Cl.
CPC ................ *G01S 7/03* (2013.01); *G01S 7/028* (2021.05); *G01S 13/931* (2013.01)

(58) Field of Classification Search
CPC ........... G01S 7/03; G01S 7/028; G01S 13/931
See application file for complete search history.

(56) References Cited

U.S. PATENT DOCUMENTS

2020/0178401 A1 6/2020 Min et al.
2021/0063557 A1* 3/2021 Yu .......................... G01S 7/027
2021/0280959 A1* 9/2021 Han ..................... H01Q 1/2283
(Continued)

FOREIGN PATENT DOCUMENTS

CN 114217309 A 3/2022
CN 114421146 A 4/2022
JP 2020123946 A 8/2020
(Continued)

OTHER PUBLICATIONS

First Examination Report mailed to Corresponding German Patent Application No. 102024102921.8 dated Nov. 7, 2024.
(Continued)

*Primary Examiner* — Nazra Nur Waheed
(74) *Attorney, Agent, or Firm* — Rosenberg, Klein & Lee

(57) ABSTRACT

An ultra-wide angle radar system includes a first antenna module, a second antenna module, and a third antenna module. The first antenna module has a flexible board antenna or an integrated circuit board. One side of the second antenna module is adjacent to one side of the first antenna module and one side of the third antenna module is adjacent to another side of the first antenna module. The first, second, and third antenna modules have distinct radiating directions. One or both of the second antenna module and the third antenna module, connected to the first antenna module, transmit signals by coupling radiation or metallic connections. Therefore, the viewable angle during detection is greater than 180 degrees. The design can be adjusted according to requirements for different detection ranges in different applications such as long-range, medium-range, and short-range detection.

7 Claims, 12 Drawing Sheets

(56) References Cited

U.S. PATENT DOCUMENTS

| | | | | |
|---|---|---|---|---|
| 2021/0305720 A1* | 9/2021 | Zhang | ...................... | H01Q 1/38 |
| 2023/0114899 A1* | 4/2023 | Ay | .......................... | G01S 13/87<br>342/70 |

FOREIGN PATENT DOCUMENTS

| | | | |
|---|---|---|---|
| JP | 2022067597 | A | 5/2022 |
| WO | 2023104161 | A1 | 6/2023 |

OTHER PUBLICATIONS

First Examination Report mailed to Corresponding Taiwanese Patent Application No. 113100298 dated Jan. 9, 2025.
Examination Report mailed to Corresponding Japanese Patent Application No. 2024016461 dated Oct. 8, 2024.

* cited by examiner

ULTRA-WIDE ANGLE RADAR SYSTEM

BACKGROUND OF THE INVENTION

This application claims priority for the TW patent application no. 113100298 filed on 3 Jan. 2024, the content of which is incorporated by reference in its entirely.

FIELD OF THE INVENTION

The present invention relates to a radar system, particularly to an ultra-wide angle radar system.

DESCRIPTION OF THE RELATED ART

The conventional radar systems achieve the purpose of detecting obstacles by transmitting and receiving millimeter-wave wireless signals. The accuracy of detecting obstacles is affected by the angle or efficiency of the radar. Take vehicle applications as an example. The vehicles in different road conditions or different environments are provided with radars whose detection angles are limited. The radars are affected by external factors in the environment, thus decreasing the detection accuracy.

Generally speaking, the maximum viewable angle of radar is usually about 120 degrees. Limited by the mechanism design and the radar itself, it is usually unable to effectively detect the areas on both sides of the radar. The area is the so-called radar blind zone. Generally, at least two wireless signal transceivers will be installed in blind spot detection. The positions and angles of the two signal transceivers will affect the effect of receiving and transmitting signals. Therefore, the positions and angles of the two signal transceivers must be endlessly adjusted during the design process, making the overall design of the transceivers more complex. In the field of vehicles, safety is the biggest demand. If misjudgment or inaccuracy occurs due to angle problems or environmental influences, the risk of driving will increase.

In addition to applications in the vehicle field, there are also similar needs in industrial automation, drones, unmanned boats, logistics, warehousing and other fields. However, due to the limitations of current radar development, the horizontal field of view (HFOV) of a single radar is usually limited. In general, the narrower field of view is usually designed for long-range radar (LRR) and the wider field of view is usually designed for short-range radar (SRR). However, the horizontal field of view (HFOV) of a single radar has a range of about 10~120 degrees but usually cannot cover the areas on both sides of the radar that belong to the field of view of the radar greater than 120 degrees. Therefore, in order to overcome the abovementioned problems, the present invention provides different designs required for long-range, middle-range and short-range detection. Improving the accuracy of the radar system and increasing the viewable angle will be one of objectives achieved by the present invention. Thus, the present invention provides an ultra-wide angle radar system that can improve the accuracy of the radar system and increase the viewable angle, so as to solve the afore-mentioned problems of the prior art.

SUMMARY OF THE INVENTION

The objective of the present invention is to provide an ultra-wide angle radar system whose viewable angle is greater than 180 degrees during detection. The design of the radar system can be adjusted according to requirements for different detection ranges, such as long-range, medium-range, and short-range detection.

According to the objective of the present invention, an ultra-wide angle radar system is provided, which includes a first antenna module, a second antenna module, and a third antenna module. The first antenna module has a flexible board antenna. One side of the second antenna module is adjacent to one side of the first antenna module. One side of the third antenna module is adjacent to another side of the first antenna module. Each of the second antenna module and the third antenna module has an integrated circuit board that includes a radar circuit board and a rigid board antenna. One or both of the rigid board antennas of the second antenna module and the third antenna module are connected to the flexible board antenna of the first antenna module. The rigid board antenna and the flexible board antenna transmit signals between each other by coupling radiation or metallic connections.

According to the objective of the present invention, an ultra-wide angle radar system is provided, which includes a first antenna module, a second antenna module, and a third antenna module. The first antenna module has an integrated circuit board that includes a radar circuit board and a rigid board antenna. One side of the second antenna module is adjacent to one side of the first antenna module. One side of the third antenna module is adjacent to another side of the first antenna module. Each of the second antenna module and the third antenna module has a flexible board antenna. Alternatively, the second antenna module and the third antenna module respectively have the flexible board antenna and another the integrated circuit board. One or both of the flexible board antennas of the second antenna module and the third antenna module are connected to the rigid board antenna of the first antenna module. The rigid board antenna and the flexible board antenna transmit signals between each other by coupling radiation or metallic connections.

To sum up, the present invention can be used in the vehicle field and applied to an advanced driver assistance system (ADAS) or other fields, such as industrial automation, drones, unmanned boats, logistics and warehousing, etc. The present invention makes different designs according to requirements for long-range, medium-range, and short-range detection and has a viewable angle greater than 180 degrees in detection. The present invention can adjust the design according to requirements for different detection ranges and improve the accuracy of the radar system to provide an omnibearing ultra-wide angle radar system.

Below, the embodiments are described in detail in cooperation with the drawings to make easily understood the technical contents, characteristics and accomplishments of the present invention.

DETAILED DESCRIPTION OF THE INVENTION

Figure 1:
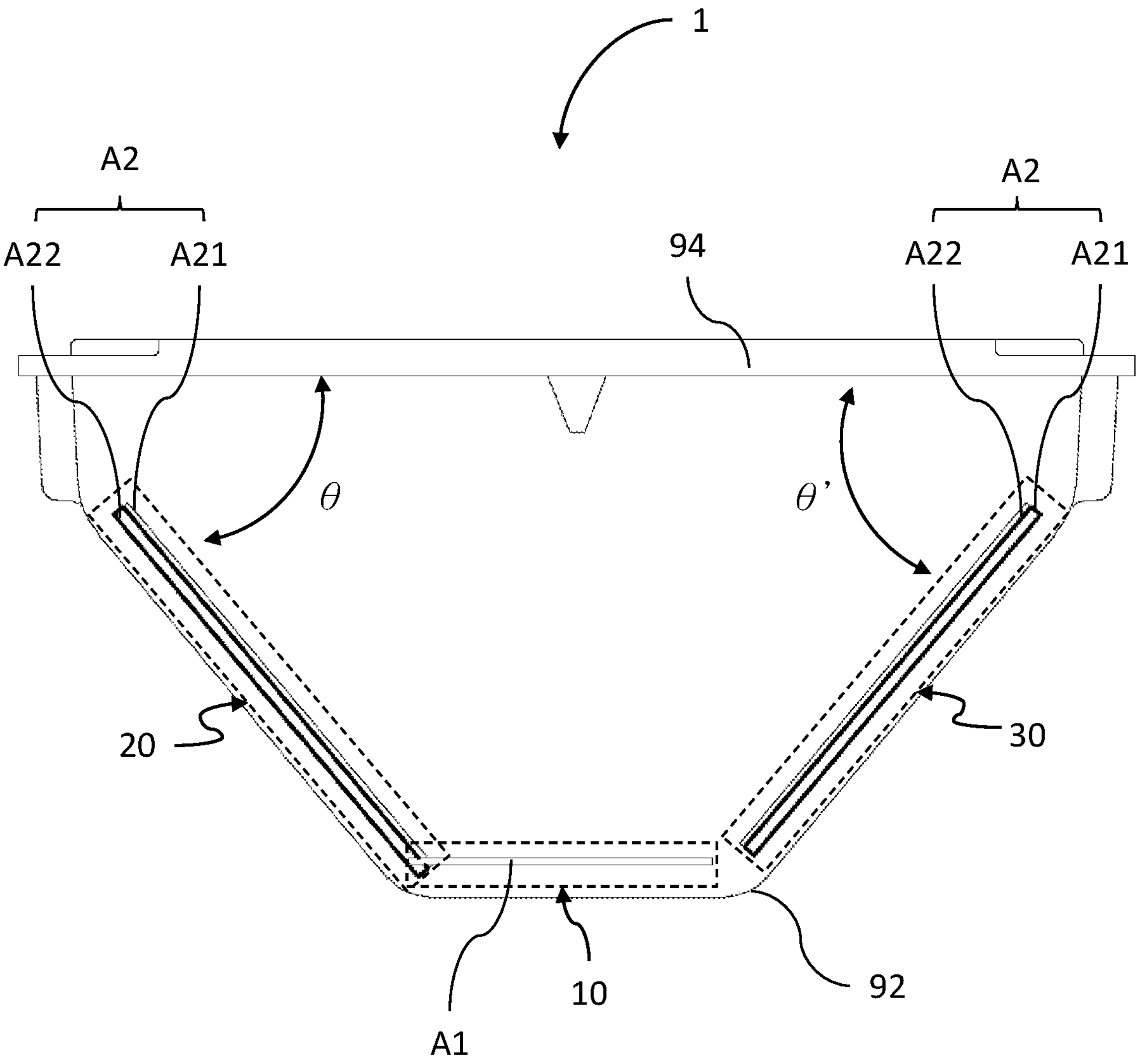
FIG. 1 is a cross-sectional view of an ultra-wide angle radar system according to a first embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternations and modifications will be apparent to those skilled in the art, once informed by the present disclosure.

Figure 2:
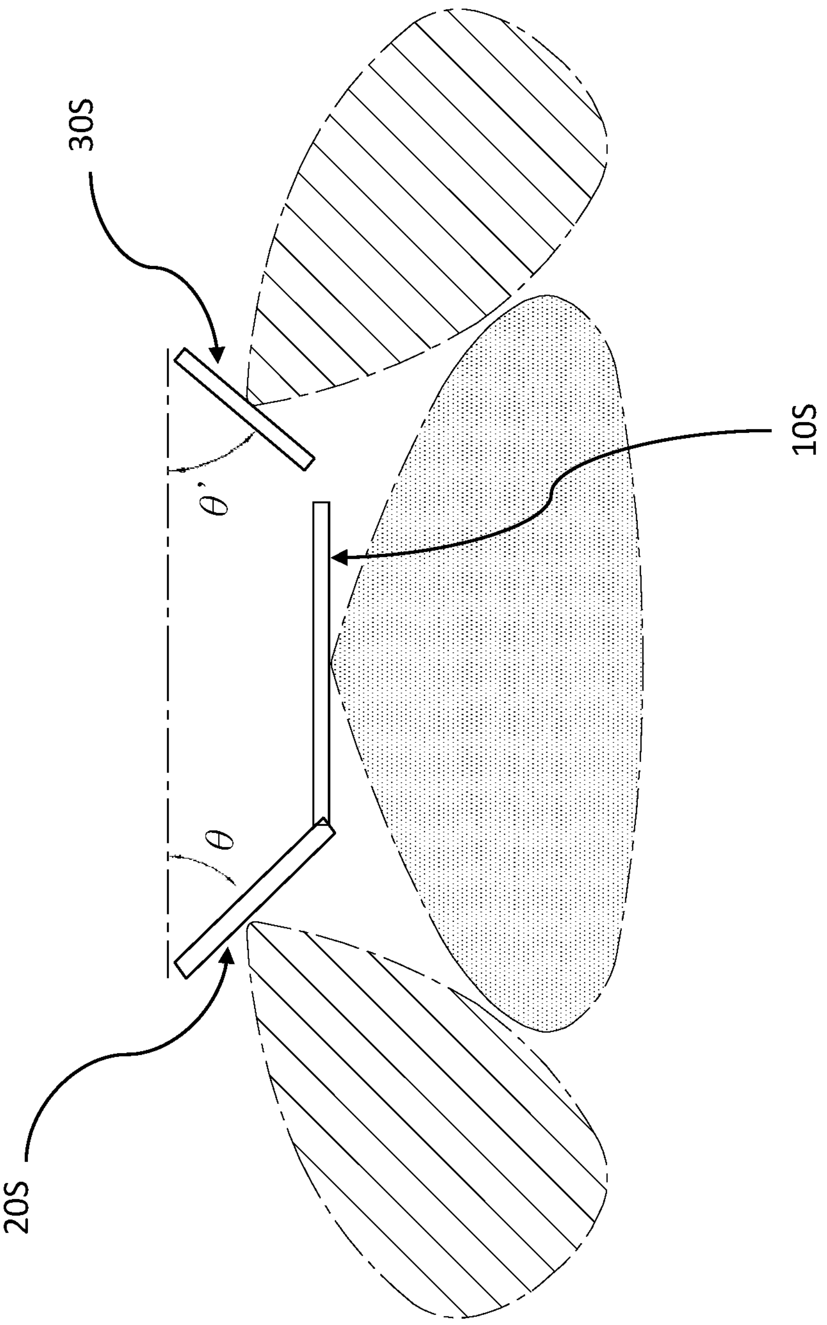
FIG. 2 is a schematic diagram illustrating the radiating directions of the ultra-wide angle radar system according to the first embodiment of the present invention.
Figure 3:
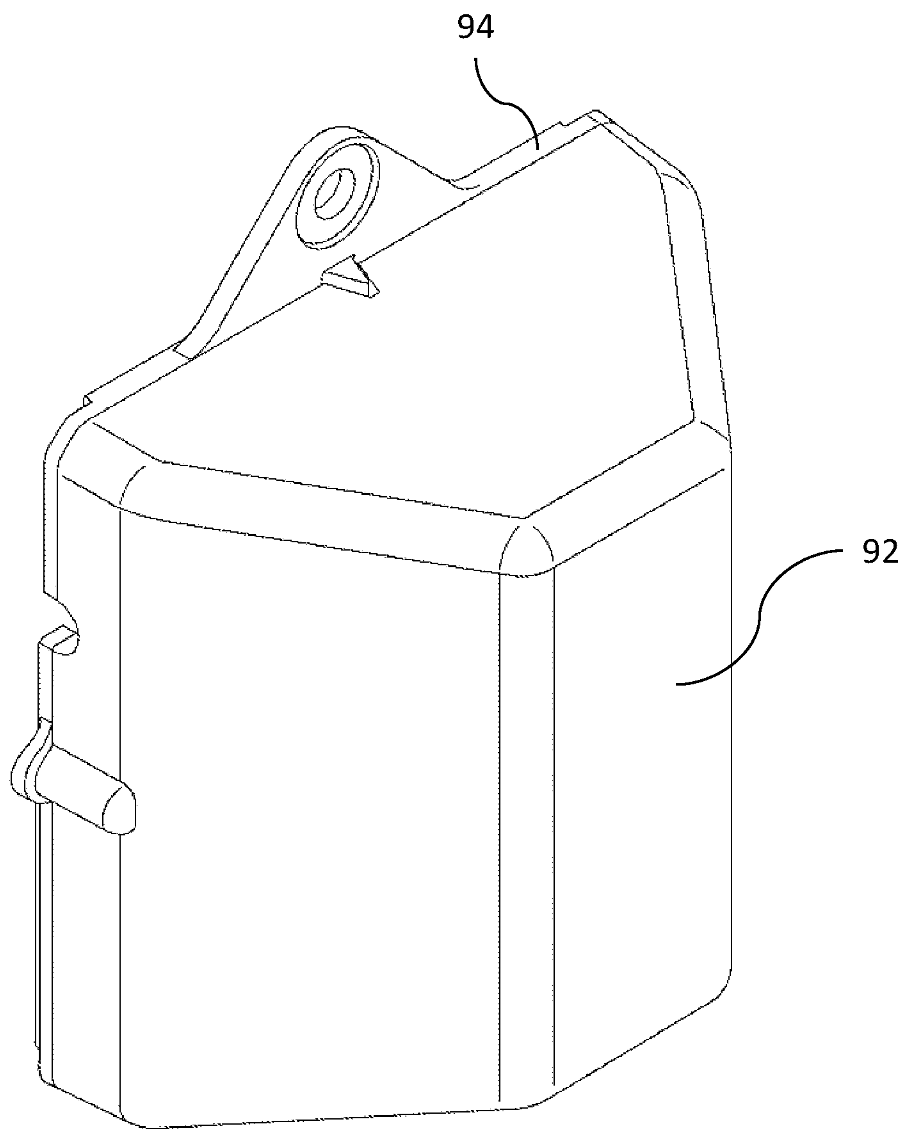
FIG. 3 is a perspective view of the ultra-wide angle radar system according to the first embodiment of the present invention.

Please refer to FIGS. 1-3. An ultra-wide angle radar system 1 includes a first antenna module 10, a second antenna module 20, and a third antenna module 30. The first antenna module 10 has a flexible board antenna A1 also called a flexible printed circuit antenna. The flexible printed circuit antenna is a flexible antenna. One side of the second antenna module 20 is adjacent to one side of the first antenna module 10 and one side of the third antenna module 30 is adjacent to another side of the first antenna module 10. Each of the second antenna module 20 and the third antenna module 30 has an integrated circuit board A2 that includes a radar circuit board A22 and a rigid board antenna A21. The radar circuit board A22 includes components for processing radar signals and managing power. The rigid board antenna A21 can be called an antenna printed circuit board or a printed circuit board antenna. One or all of the rigid board antennas A21 of the second antenna module 20 and the third antenna module 30 are connected to the flexible board antenna A1 of the first antenna module 10. As a result, when the rigid antenna board A21 is connected to the flexible board antenna A1, the rigid board antenna A21 and the flexible board antenna A1 transmit signals between each other by coupling radiation or metallic connections. As illustrated in FIG. 1, the embodiment exemplifies the flexible board antenna of the first antenna module 10 connected to the rigid board antenna A21 if the second antenna module 20, but the present invention is not limited thereto.

Continuing with the foregoing description, the first antenna module 10, the second antenna module 20, and the third antenna module 30 have different radiating directions. Each of the first antenna module 10, the second antenna module 20, and the third antenna module 30 may be, but not limited to, a patch antenna, a slot antenna, a horn antenna, a Yagi-Uda antenna, or a dipole antenna. When actually designing the radar circuit board A22 and the rigid board antenna A21 included in the integrated circuit board A2, the radar circuit board A22 and the rigid board antenna A21 are integrated into one body. For simplicity, the diagram does not indicate in detail which part is the radar circuit board A22 or the rigid board antenna A21. Those of ordinary skill in the art should understand from the specification and drawings that the radar circuit is installed on the corresponding circuit of the PCB board when the radar circuit board A22 is combined with the rigid board antenna A21. Therefore, the detailed circuit design is not introduced here.

The ultra-wide angle radar system 1 further includes a top cover 92 and a bottom base 94. The edge of the top cover 922 is connected to the bottom base 94 to define a space for accommodating the first antenna module 10, the second antenna module 20, and the third antenna module 30. Tho two sides of the top cover 92 are respectively connected to another side of the second antenna module 20 and another side of the third antenna module 30 to form a quadrilateral structure with at least three signal transceiver surfaces 10S, 20S, and 30S. An included angle θ between the top cover 92 and the second antenna module 20 is equal or unequal to an included angle θ' between the top cover 92 and the third antenna module 30. In a preferred embodiment, each of the included angles θ and θ' may have a range of 20~80 degrees.

For example, when the ultra-wide angle radar system 1 is applied to the vehicle field, the bottom base 94 can be installed at any position of the vehicle body. When the vehicle moves in different road conditions or environments, the ultra-wide angle radar system 1 at any position can be used to detect the surroundings. The total field of view of the ultra-wide angle radar system 1 is greater than 180 degrees. Thus, there is no need to install multiple radars to achieve the effect of ultra-wide angle detection. The ultra-wide angle radar system 1 can be used to long-range, medium-range, and short-range detection, which can indeed reduce costs and improve driving safety.

Figure 4:
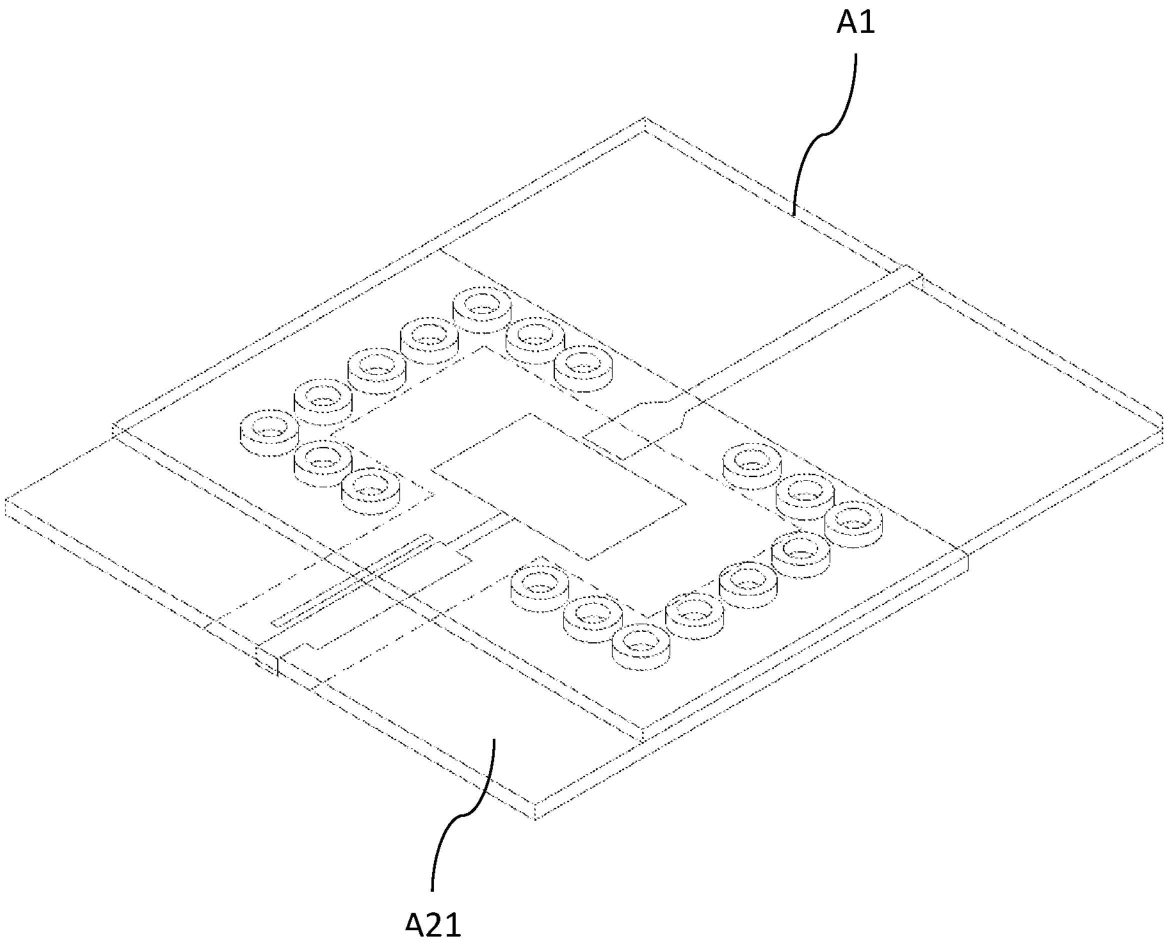
FIG. 4 is a schematic diagram illustrating a rigid board antenna connected to a flexible board antenna according to an embodiment of the present invention.
Figure 5:
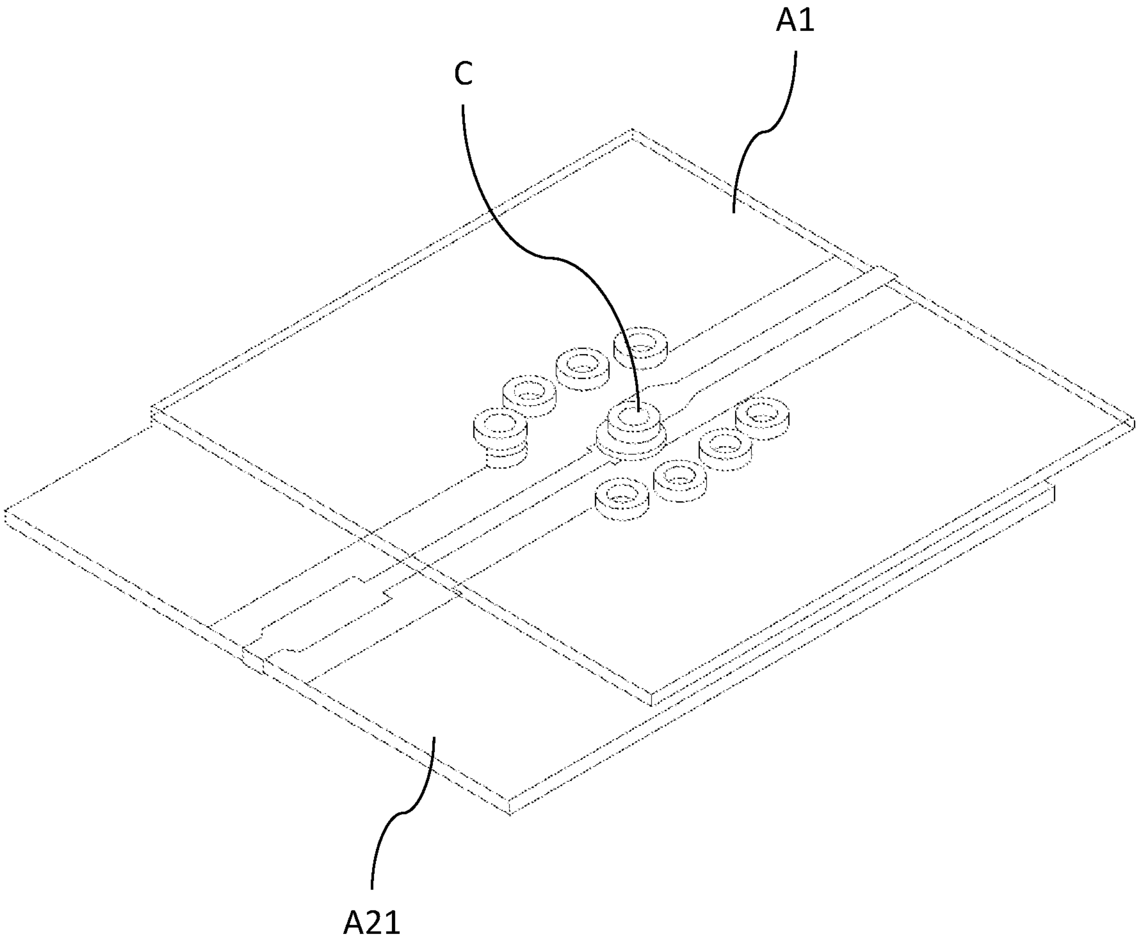
FIG. 5 is a schematic diagram illustrating a rigid board antenna connected to a flexible board antenna according to another embodiment of the present invention.

Please refer to FIG. 4 and FIG. 5. The rigid board antenna A21 and the flexible board antenna A1 transmit signals between each other by coupling radiation or metallic connections, which is introduced as follows. As illustrated in FIG. 4, the upper part is the flexible board antenna A1 and and the lower part is the rigid board antenna A21. Based on the edge radiation effect of the antenna, the signal is transmitted from the lower rigid board antenna A21 to the upper flexible board antenna A1, so that the signals are transmitted between the flexible board antenna A1 and the rigid board antenna A21. As illustrated in FIG. 5, the upper part is the flexible board antenna A1 and the lower part is the rigid board antenna A21. The upper flexible board antenna A1 directly contacts the lower rigid board antenna A21 through metal through holes C. The diameter of the metal through hole C can be adjusted to change the strength of transmission signals and the magnitude of output power.

Figure 6:
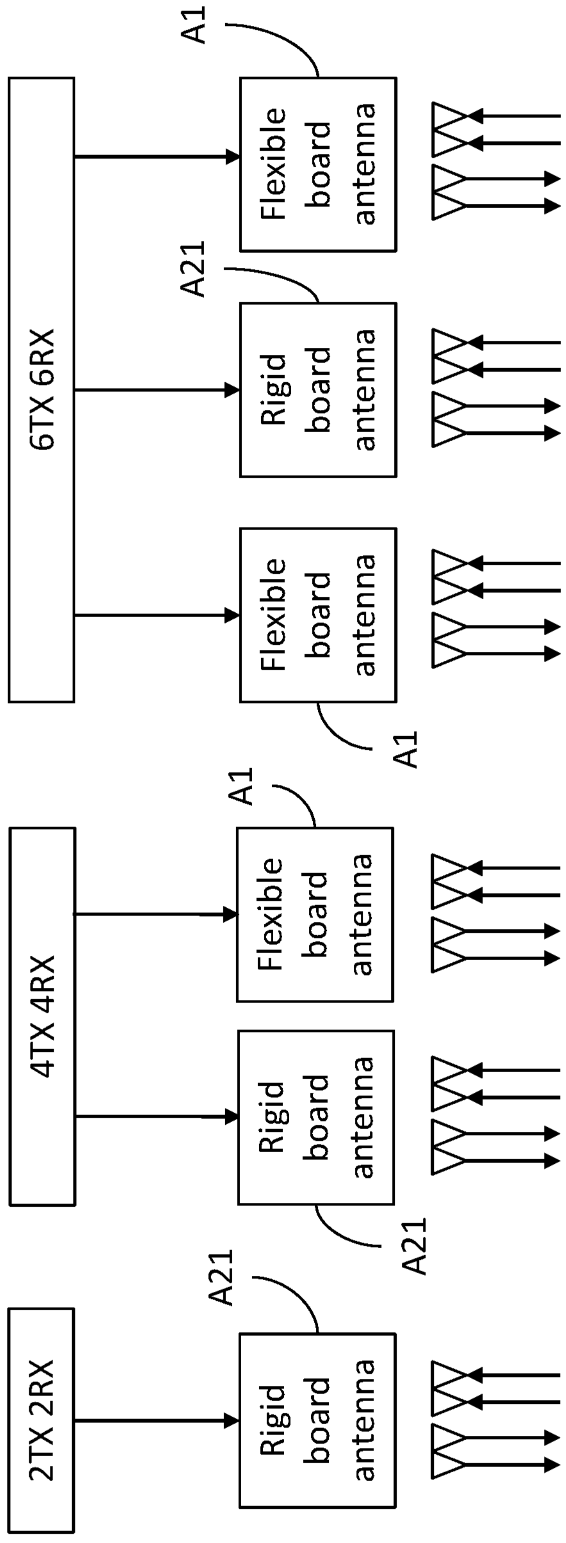
FIG. 6 is a schematic diagram illustrating the arrangement of rigid board antennas and flexible board antennas according to an embodiment of the present invention.

Continuing with the foregoing description, the signal transmission of the antennas is introduced as follows. Please refer to FIG. 6. During signal transmission, the rigid board antenna A21 can be implemented with a single-input single-output (SISO) antenna or a multiple-input multiple-output (MIMO) antenna. However, when the rigid board antenna A21 is connected to the flexible board antenna A1, the rigid board antenna A21 and the flexible board antenna A1 connected to each other are implemented with MIMO antennas, such as two-input two-output (2TX 2RX) antennas. The rigid board antenna A21 transmits a one-input signal and receives a one-output signal and the flexible board antenna A1 transmits another-input signal and receives another-output signal. If applied to the coordinate positioning of a target, each of the first antenna module 10, the second antenna module 20, and the third antenna module 30 needs at least one output and two inputs based on the principle of a frequency modulated continuous wave (FMCW) for target positioning, which is not reiterated. FIG. 6 is a schematic diagram only illustrating the arrangement of antennas. The present invention is not limited to a fact that each of the first antenna module 10, the second antenna module 20, and the third antenna module 30 includes a two-input two-output (2TX 2RX) antenna.

Figure 7:
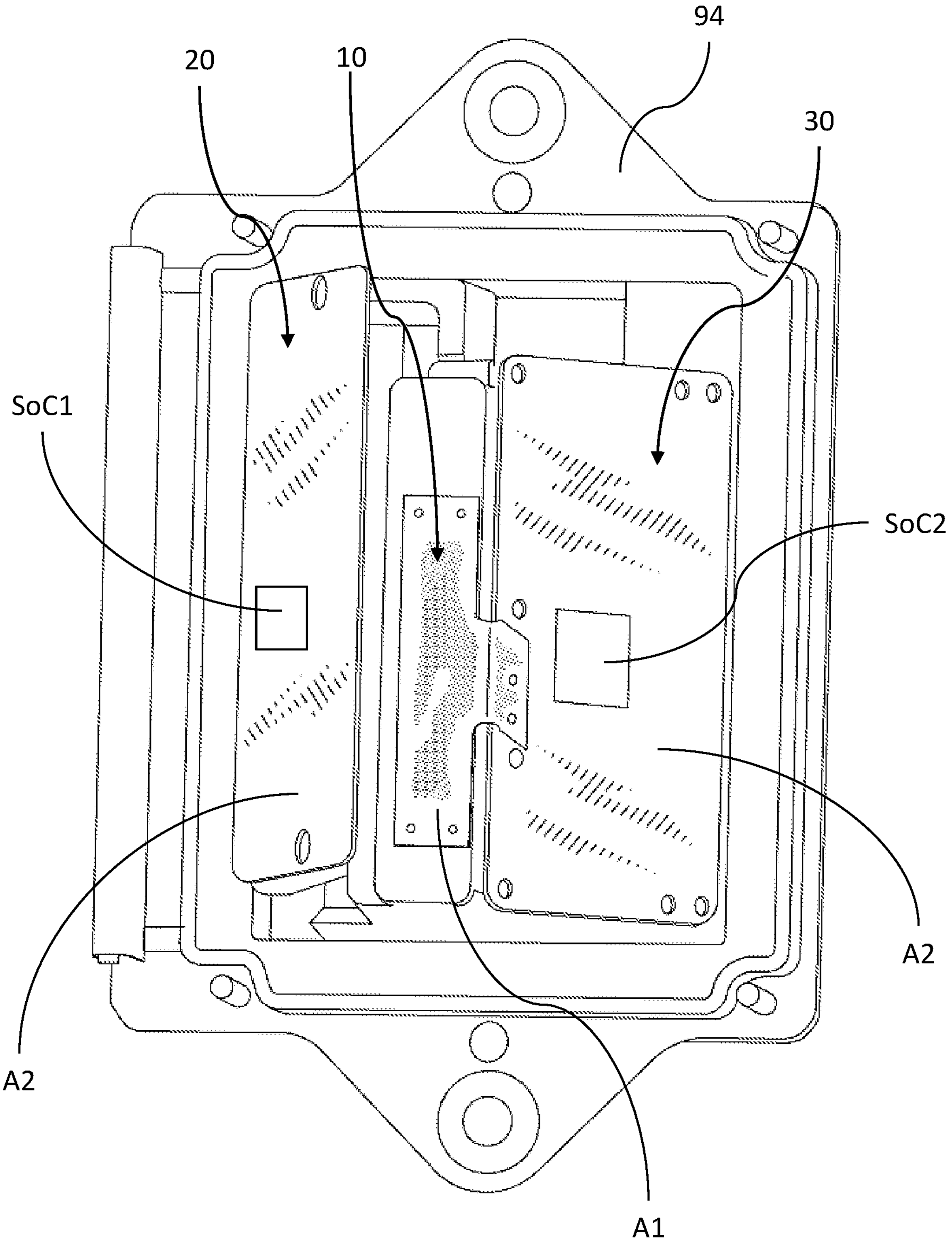
FIG. 7 is a schematic diagram illustrating an ultra-wide angle radar system whose bottom base is opened according to an embodiment of the present invention.

Please refer to FIG. 7 and FIG. 1. The radar circuit boards A22 of the second antenna module 20 and the third antenna module 30 are respectively provided with system-on-chips SoC1 and SoC2. The system-on-chip SoC1 is configured to process signals transmitted by the second antenna module 20 and manage a power provided to the second antenna module 20. The system-on-chip SoC2 is configured to process signals transmitted by the third antenna module 30 and manage a power provided to the third antenna module 30. When the rigid board antenna A21 is connected to the flexible board antenna A1, the first antenna module 10 is controlled by the system-on-chip used for the second antenna module 20 or the third antenna module 30 connected to the first antenna module 10.

The radar circuit board A22 includes, but is not limited to, a radio-frequency (RF) front end circuit, a digital signal processor (DSP), a microcontroller unit (MCU), a power management integrated circuit (PMIC), and other components for processing radar signals and managing power. As a result, when the radar circuit boards A22 of the second antenna module 20 and the third antenna module 30 are respectively provided with the system-on-chips SoC1 and SoC2, each of the system-on-chips SoC1 and SoC2 is an integrated circuit (IC) that integrates the foregoing electronic system including the RF front end circuit, the DSP, the MCU, etc.

Take FIG. 7 as an example. The flexible board antenna A1 of the first antenna module 10 is connected to the rigid board antenna A21 of the third antenna module 30. The system-on-chip SoC2 on the rigid board antenna A21 simultaneously control the first antenna module 10 and the third antenna module 30 to receive and transmit signals. Since the rigid board antenna A21 of the second antenna module 20 is not connected to the flexible board antenna A1 of the first antenna module 10, the second antenna module 20 employs its system-on-chip SoC2 to simultaneously receive and transmit signals.

Figure 8:
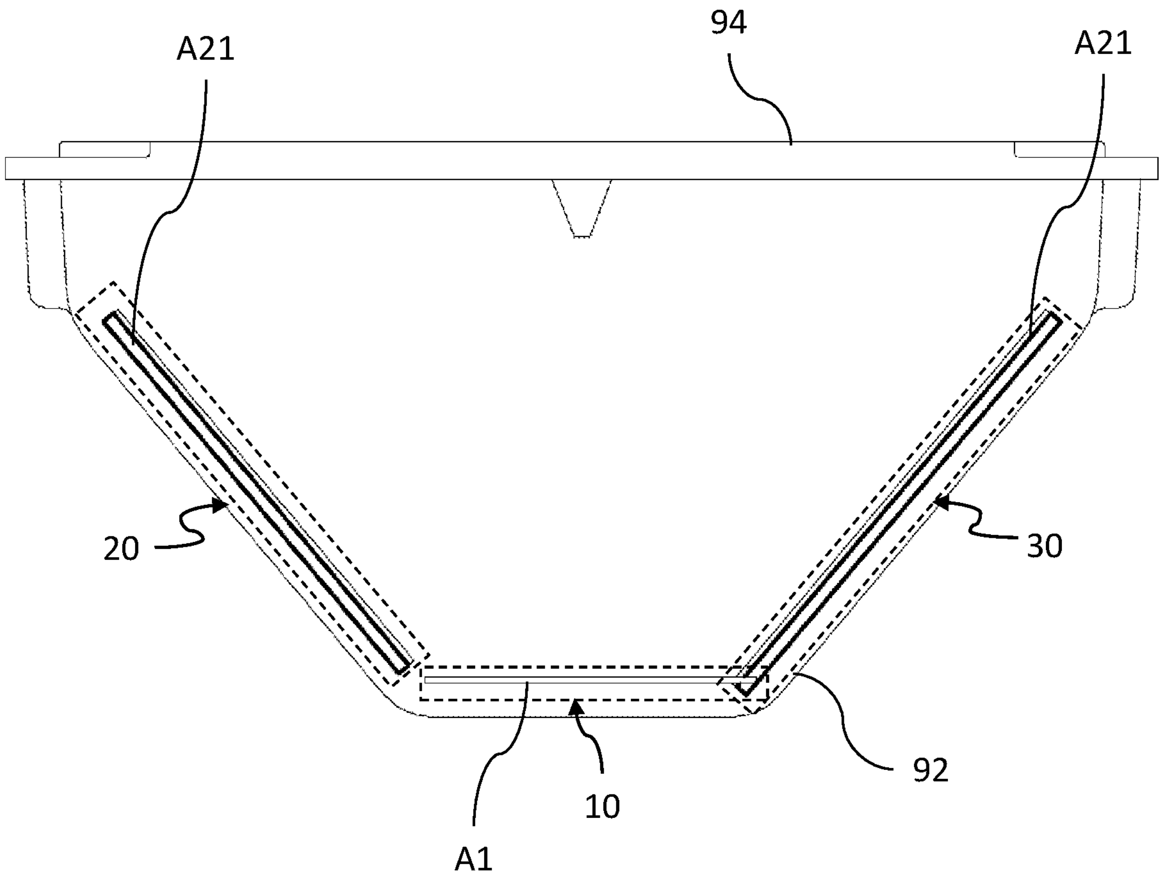
FIG. 8 is a cross-sectional view of an ultra-wide angle radar system according to a second embodiment of the present invention.

Please refer to FIG. 8. FIG. 8 is different from FIG. 1 in the connection location of the flexible board antenna A1 of the first antenna module 10. As illustrated in FIG. 8, the flexible board antenna A1 of the first antenna module 10 is connected to the rigid board antenna A21 of the third antenna module 30. The system-on-chip on the rigid board antenna A21 simultaneously control the first antenna module 10 and the third antenna module 30 to receive and transmit signals. Since the rigid board antenna A21 of the second antenna module 20 is not connected to the flexible board antenna A1 of the first antenna module 10, the second antenna module 20 employs its system-on-chip SoC2 to simultaneously receive and transmit signals.

Figure 9:
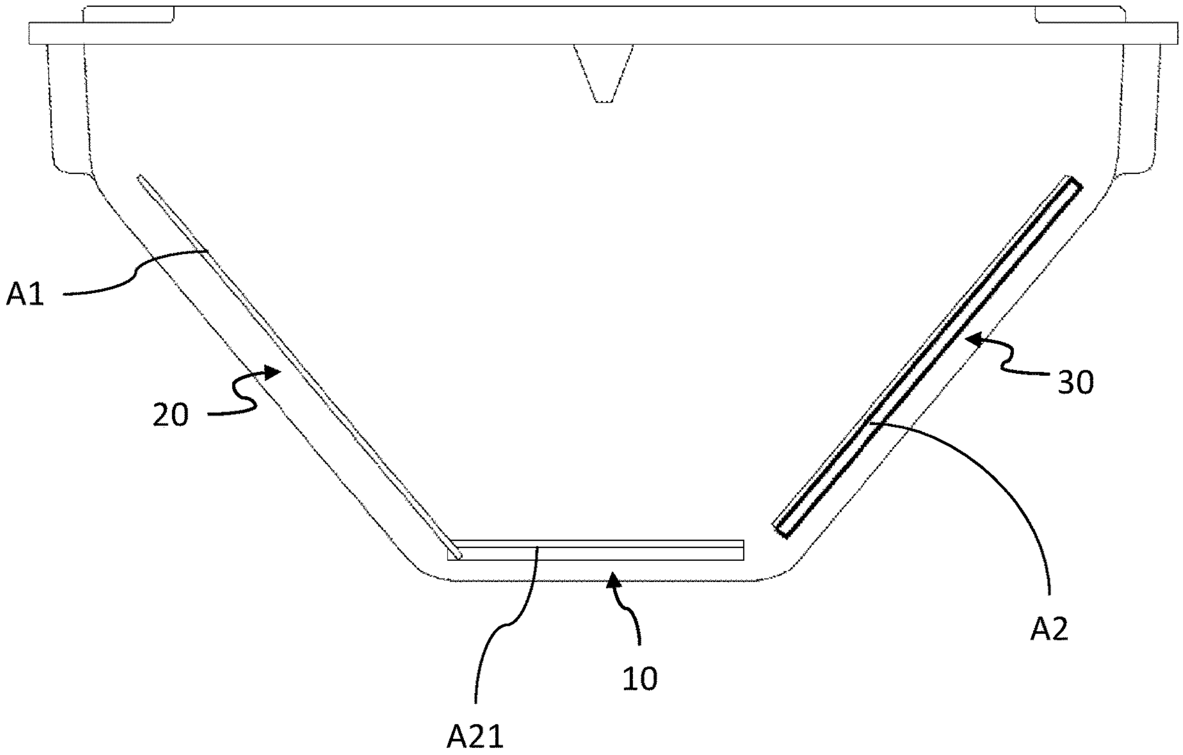
FIG. 9 is a cross-sectional view of an ultra-wide angle radar system according to a third embodiment of the present invention.
Figure 10:
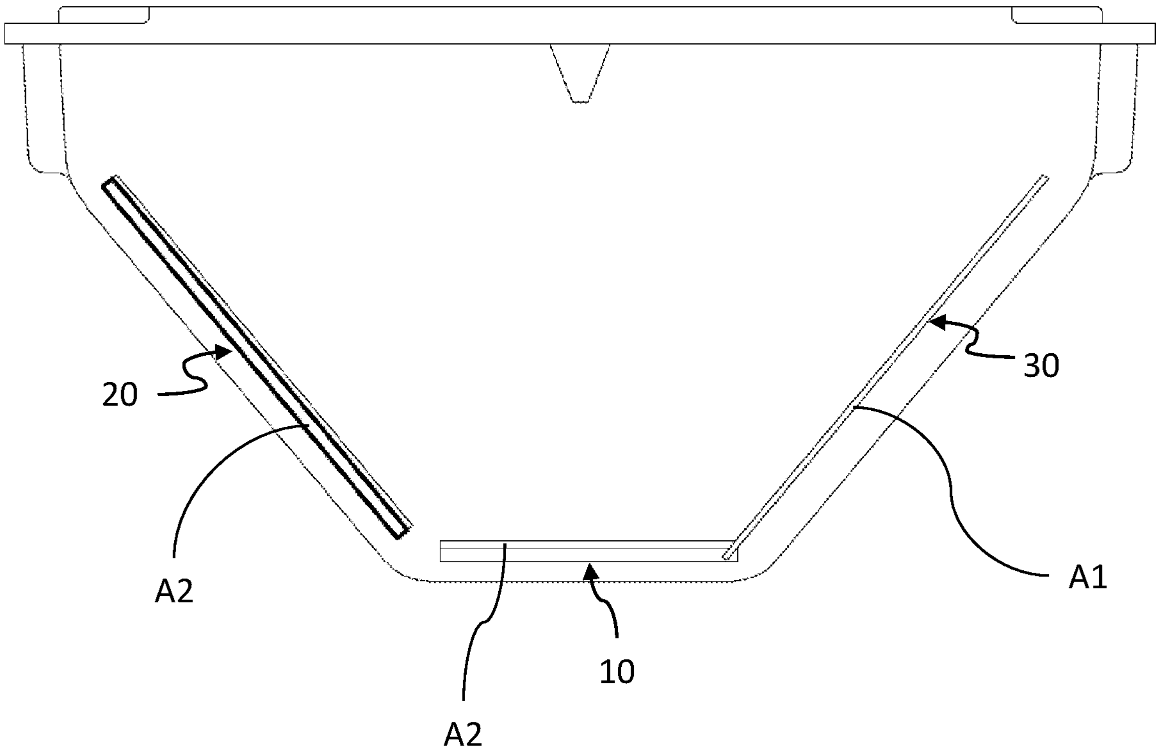
FIG. 10 is a cross-sectional view of an ultra-wide angle radar system according to a fourth embodiment of the present invention.
Figure 11:
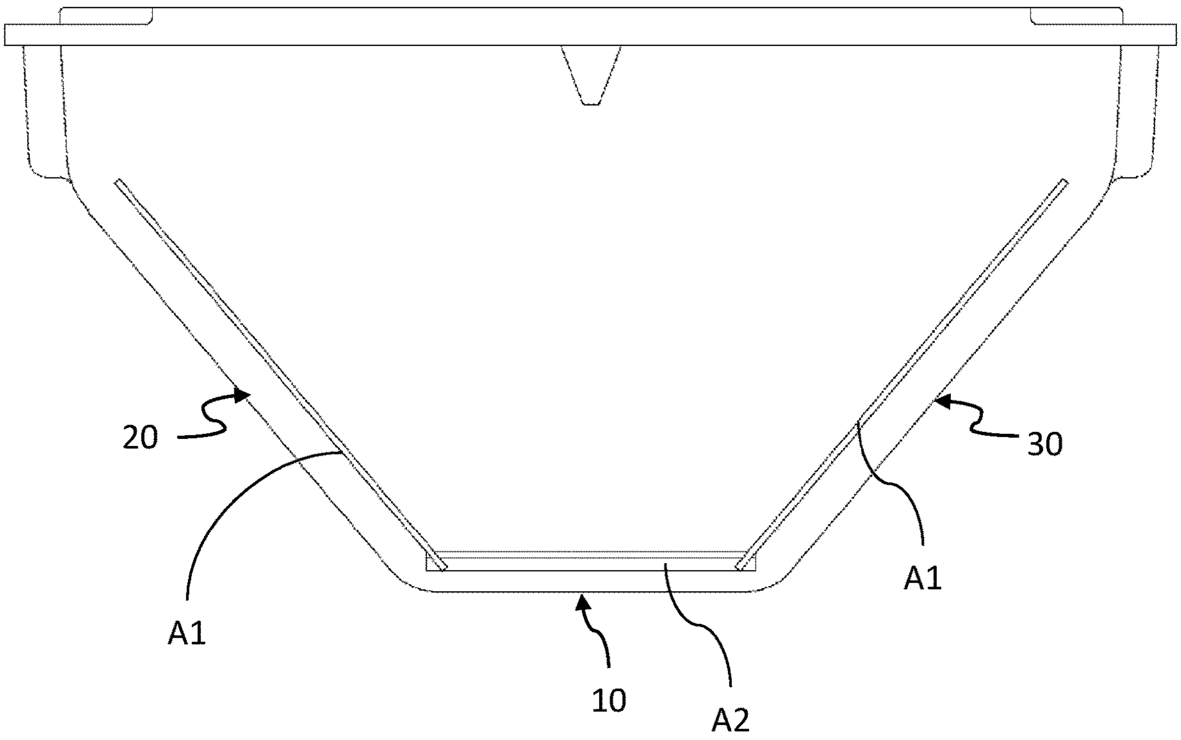
FIG. 11 is a cross-sectional view of an ultra-wide angle radar system according to a fifth embodiment of the present invention.

FIGS. 9-11 respectively illustrate a third embodiment, a fourth embodiment, and a fifth embodiment of the present invention. The ultra-wide angle radar system in FIGS. 9-11 includes a first antenna module 10, a second antenna module 20, and a third antenna module 30. Each of the third embodiment, the fourth embodiment, and the fifth embodiment is different from the first embodiment in a connection relationship among the first antenna module 10, the second antenna module 20, and the third antenna module 30. In the third embodiment, the fourth embodiment, and the fifth embodiment, the first antenna module 10 has an integrated circuit board A2 that also includes a radar circuit board A22 and a rigid board antenna A21. One side of the second antenna module 20 is adjacent to one side of the first antenna module 10 and one side of the third antenna module 30 is adjacent to another side of the first antenna module 10. In the third embodiment and the fourth embodiment, the first antenna module 10 has an integrated circuit board A2 and the second antenna module 20 and the third antenna module 30 respectively have the flexible board antenna A1 and another integrated circuit board A2. In the fifth embodiment, the first antenna module 10 has an integrated circuit board A2 and each of the second antenna module 20 and the third antenna module 30 has a flexible board antenna A1. One or all of the flexible board antennas A1 of the second antenna module 20 and the third antenna module 30 are connected to the rigid board antenna A21 of the first antenna module 10. When the rigid board antenna A21 is connected to the flexible board antenna A1, the rigid board antenna A21 and the flexible board antenna A1 transmit signals between each other by coupling radiation or metallic connections. The other components in the third embodiment, the fourth embodiment, and the fifth embodiment have been described previously so it will not be reiterated. In order to allow those of ordinary skill in the art to better understand the differences among the third embodiment, the fourth embodiment, and the fifth embodiment, the present invention provides the following description. Please refer to FIGS. 9-11 of the present invention.

As illustrated in FIG. 9, the first antenna module 10 has an integrated circuit board A2 and the second antenna module 20 has a flexible board antenna A1. The rigid board antenna A21 of the first antenna module 10 is connected to the flexible board antenna A1 of the second antenna module 20. Their connection manner has been described previously so it will not be reiterated. The third antenna module 30 has another integrated circuit board A2. One side of the third antenna module 30 is adjacent to and disconnected from another side of the first antenna module 10.

As illustrated in FIG. 10, the first antenna module 10 has an integrated circuit board A2 and the third antenna module 30 has a flexible board antenna A1. The rigid board antenna A21 of the first antenna module 10 is connected to the flexible board antenna A1 of the third antenna module 30. Their connection manner has been described previously. The second antenna module 20 has another integrated circuit board A2. One side of the second antenna module 20 is adjacent to and disconnected from another side of the first antenna module 10.

As illustrated in FIG. 11, the first antenna module 10 has an integrated circuit board A2 and each of the second antenna module 20 and the third antenna module 30 has a flexible board antenna A1. The rigid board antenna A21 of the first antenna module 10 is connected to each of the flexible board antennas of the second antenna module 20 and the third antenna module 30. Their connection manner has been described previously so it will not be reiterated.

Figure 12:
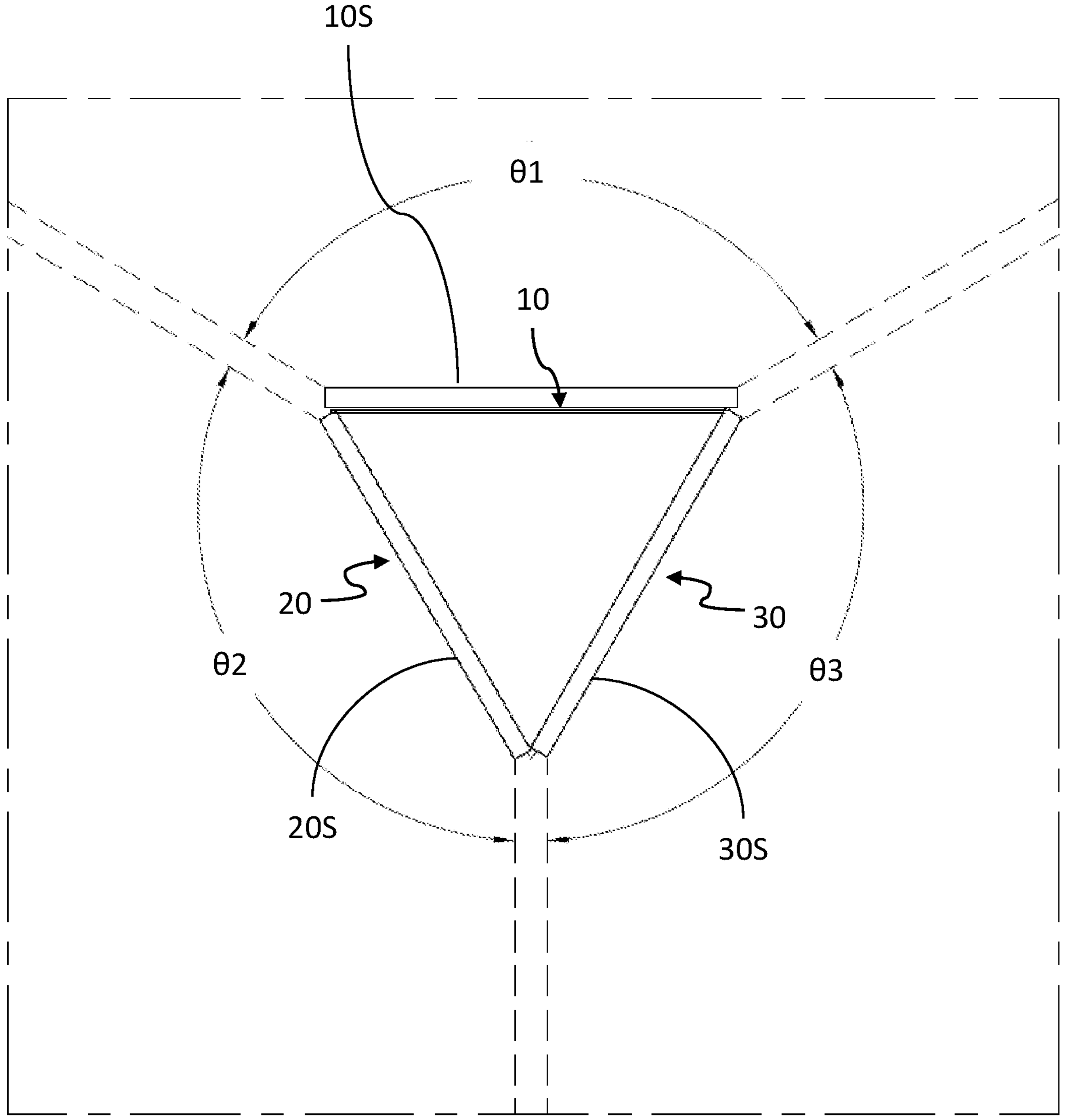
FIG. 12 is a cross-sectional view of an ultra-wide angle radar system according to a sixth embodiment of the present invention.

FIG. 12 illustrates a sixth embodiment of the present invention. Please refer to FIG. 12. The sixth embodiment is different from the first embodiment in included angles and connection relationships among the first antenna module 10, the second antenna module 20, and the third antenna module 30. In the sixth embodiment, another side of the second antenna module 20 is connected to another side of the third antenna module 30 to form at least three signal transceiver surfaces 10S, 20S, and 30S. The detection angle θ1 of the signal transceiver surface 10S, the detection angle θ2 of the signal transceiver surface 20S, and the detection angle θ3 of the signal transceiver surface 30S are equal or unequal. In a preferred embodiment, the detection angles θ1, θ2, and θ3 are 120 degrees to form a viewable range of 360 degrees. This way, the triangular structure enables a wider viewable angle and its coverage range is as large as 360 degrees. Therefore, the present invention can also be applied to 360-degree unmanned aerial vehicle (UAV) short-range obstacle detection, which improves the problem with detection blind spots. The other components of the sixth embodiment have been introduced in the first embodiment so it will not be reiterated.

According to the embodiments provided above, the ultra-wide angle radar system is designed with the same concept for long-range, medium-range, and short-range detection. The ultra-wide angle radar system can shorten the development time during design and development, reduce the time cost of adjusting parameters in early development, and improve efficiency. The present invention has a viewable angle greater than 180 degrees in detection, which not only improves the accuracy of the radar system, but also solves the problem with visual blind spots to provide users with an omnibearing ultra-wide angle radar system.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An ultra-wide angle radar system comprising:

a first antenna module having a flexible board antenna;

a second antenna module with one side thereof adjacent to one side of the first antenna module; and a third antenna module with one side thereof adjacent to another side of the first antenna module;

wherein each of the second antenna module and the third antenna module includes an integrated circuit board, and each the integrated circuit board includes a radar circuit board and a rigid board antenna;

wherein at least one of the rigid board antenna of the second antenna module and the rigid board antenna of the third antenna module is connected to the flexible board antenna of the first antenna module, and the connected rigid board antenna and the flexible board antenna transmit signals between each other by coupling radiation or metallic connections.

2. The ultra-wide angle radar system according to claim 1, further comprising a bottom base with two sides thereof respectively connected to another side of the second antenna module and another side of the third antenna module to form a quadrilateral structure with at least three signal transceiver surfaces.

3. The ultra-wide angle radar system according to claim 2, wherein an included angle between the bottom base and the second antenna module has a range of 20~80 degrees.

4. The ultra-wide angle radar system according to claim 2, wherein an included angle between the bottom base and the third antenna module has a range of 20~80 degrees.

5. The ultra-wide angle radar system according to claim 1, wherein another side of the second antenna module is connected to another side of the third antenna module to form at least three signal transceiver surfaces.

6. The ultra-wide angle radar system according to claim 5, wherein each of the at least three signal transceiver surfaces has a detection angle of 120 degrees.

7. The ultra-wide angle radar system according to claim 1, wherein the radar circuit board of each of the second antenna module and the third antenna module is provided with a system-on-chip for processing signals transmitted by the second antenna module or the third antenna module and managing a power provided to the second antenna module or the third antenna module, and the first antenna module is controlled by the system-on-chip used for the second antenna module or the third antenna module connected to the first antenna module.

* * * * *